(12) United States Patent
Farrell et al.

(10) Patent No.: US 8,586,183 B2
(45) Date of Patent: Nov. 19, 2013

(54) THERMOPLASTIC COMPOSITIONS, METHOD OF MANUFACTURE, AND USES THEREOF

(75) Inventors: Tony Farrell, Bergen op Zoom (NL); Johannes Hubertus G. M. Lohmeijer, Ede (NL)

(73) Assignee: Sabic Innovative Plastics IP B.V. (NL)

( * ) Notice: Subject to any disclaimer, the term of this patent is extended or adjusted under 35 U.S.C. 154(b) by 324 days.

(21) Appl. No.: 13/005,787

(22) Filed: Jan. 13, 2011

(65) Prior Publication Data
US 2012/0183778 A1 Jul. 19, 2012

(51) Int. Cl.
*B32B 7/04* (2006.01)
*B32B 27/06* (2006.01)
*B32B 27/08* (2006.01)
*B32B 27/16* (2006.01)
*B32B 27/36* (2006.01)
*B32B 37/04* (2006.01)
*B32B 37/06* (2006.01)

(52) U.S. Cl.
USPC ........ 428/412; 428/480; 156/272.8; 525/146; 525/147; 525/394; 525/437; 525/439; 528/176; 528/193; 528/194; 528/195; 528/302; 528/305; 528/308; 528/308.6; 528/308.7

(58) Field of Classification Search
None
See application file for complete search history.

(56) References Cited

U.S. PATENT DOCUMENTS

| | | | |
|---|---|---|---|
| 4,855,356 A | 8/1989 | Holub et al. | |
| 5,512,632 A * | 4/1996 | Serini et al. | 525/67 |
| 6,696,510 B2 * | 2/2004 | Lu et al. | 524/148 |
| 6,929,841 B1 | 8/2005 | Van Dijk et al. | |
| 7,153,384 B2 * | 12/2006 | Sugawara et al. | 156/272.8 |
| 7,166,669 B2 * | 1/2007 | Joachimi et al. | 524/601 |
| 7,396,428 B2 * | 7/2008 | Matsushima et al. | 156/272.8 |
| 8,008,387 B2 * | 8/2011 | Miyamoto | 524/284 |
| 8,106,126 B2 * | 1/2012 | Vaze et al. | 525/146 |
| 8,114,952 B2 * | 2/2012 | Vaze et al. | 528/196 |
| 8,142,900 B2 * | 3/2012 | Sakata | 428/480 |
| 8,193,264 B2 * | 6/2012 | Kumazawa et al. | 524/243 |
| 8,318,843 B2 * | 11/2012 | Benten et al. | 524/423 |
| 2002/0002225 A1 | 1/2002 | Reil | |
| 2003/0130381 A1 | 7/2003 | Joachimi et al. | |
| 2004/0112519 A1 * | 6/2004 | Mori | 156/272.8 |
| 2004/0186208 A1 | 9/2004 | Sumi et al. | |
| 2004/0231788 A1 | 11/2004 | Chen et al. | |
| 2004/0239007 A1 | 12/2004 | Arai et al. | |
| 2005/0048290 A1 | 3/2005 | Koshida | |
| 2005/0081991 A1 | 4/2005 | Hatase et al. | |
| 2005/0119377 A1 | 6/2005 | Ishii et al. | |
| 2005/0154099 A1 * | 7/2005 | Kobayashi et al. | 524/99 |
| 2005/0165176 A1 * | 7/2005 | Matsushima et al. | 525/437 |
| 2005/0167025 A1 | 8/2005 | Kobayashi et al. | |
| 2005/0171321 A1 | 8/2005 | Sumi | |
| 2006/0108064 A1 * | 5/2006 | Mori | 156/272.8 |
| 2007/0129475 A1 * | 6/2007 | Sakata et al. | 524/306 |
| 2007/0135587 A1 * | 6/2007 | Matsushima et al. | 525/437 |
| 2007/0173581 A1 | 7/2007 | Hager et al. | |
| 2007/0221321 A1 | 9/2007 | Bohm et al. | |
| 2007/0292651 A1 * | 12/2007 | Sugawara et al. | 428/57 |
| 2008/0004363 A1 | 1/2008 | Rosenberger | |
| 2008/0103267 A1 * | 5/2008 | Hurst et al. | 525/464 |
| 2008/0168924 A1 | 7/2008 | Melson et al. | |
| 2009/0069489 A1 * | 3/2009 | Vollenberg et al. | 524/537 |
| 2009/0130451 A1 * | 5/2009 | Farrell | 428/411.1 |
| 2009/0218325 A1 | 9/2009 | Kreischer et al. | |
| 2009/0275678 A1 | 11/2009 | Kumazawa et al. | |
| 2010/0233474 A1 * | 9/2010 | Haruhara et al. | 428/339 |
| 2011/0256406 A1 * | 10/2011 | Farrell et al. | 428/412 |

FOREIGN PATENT DOCUMENTS

| | | | |
|---|---|---|---|
| DE | 10330722 | * | 2/2005 |
| EP | 0786842 A1 | | 7/1997 |
| EP | 1847376 A1 | | 10/2007 |
| EP | 1967549 A1 | | 9/2008 |
| WO | 2006/048500 A1 | | 5/2006 |

OTHER PUBLICATIONS

DE10303193 A1, Publication date: Jul. 29, 2004, Abstract, 1 page.
DE10330722 A1, Publication date: Feb. 10, 2005, Abstract, 1 page.
DE202004016363 U1, Publication date: Mar. 2, 2006, Abstract, 1 page.
EP 0126787 A1, Publication date: Dec. 5, 1984, Abstract, 1 page.
EP 1440784 A1, Publication date: Jul. 28, 2004, Abstract, 2 pages.
JP10292100 A, Publication date: Nov. 4, 1998, Abstract, 1 page.
JP2003136601 A, Publication date: May 14, 2003, Abstract, 2 pages.

(Continued)

*Primary Examiner* — Vivian Chen
(74) *Attorney, Agent, or Firm* — Cantor Colburn LLP

(57) ABSTRACT

A laser composition comprises a combination of:
(a) from more than 45 to less than 94 weight percent of a crystalline or semi-crystalline thermoplastic polyester component selected from poly(butylene terephthalate), poly(ethylene terephthalate), poly(butylene terephthalate) copolymers poly(ethylene terephthalate) copolymers, and combinations thereof;
(b) from greater than 6 to less than 25 weight percent of an amorphous thermoplastic poly(ester) copolymer, poly (ester-carbonate), or combination thereof;
(c) optionally, from 1 to 30 weight percent of a filler; and
(d) optionally, from 0.01 to 5 weight percent of an antioxidant, mold release agent, colorant, stabilizer, or a combination thereof;
wherein an article having a 2 mm thickness and molded from the composition has
(i) a near infrared transmission at 960 nanometers of greater than 30 percent and
(ii) a Vicat softening temperature of at least 170° C.

21 Claims, No Drawings

(56) References Cited

OTHER PUBLICATIONS

JP2003292752 A, Publication date: Oct. 15, 2003, Abstract, 1 page.
JP2004182835 A, Publication date: Jul. 2, 2004, Abstract, 2 pages.
JP2004224925 A, Publication date: Aug. 12, 2004, Abstract, 2 pages.
JP2004250621 A, Publication date: Sep. 9, 2004, Abstract, 1 page.
JP2004315776 A, Publication date: Nov. 11, 2004, Abstract, 1 page.
JP2004315805 A, Publication date: Nov. 11, 2004, Abstract, 1 page.
JP2005001350 A, Publication date: Jan. 6, 2005, Abstract, 1 page.
JP2005133087 A, Publication date: May 26, 2005, Abstract, 1 page.
JP2006117830 A, Publication date: May 11, 2006, Abstract, 1 page.
JP2006187875 A, Publication date: Jul. 20, 2006, Abstract, 1 page.
JP2006188599 A, Publication date: Jul. 20, 2006, Abstract, 1 page.
JP2006249260 A, Publication date: Sep. 21, 2006, Abstract, 1 page.
JP2006257338 A, Publication date: Sep. 28, 2006, Abstract, 1 page.
JP2006291099 A, Publication date: Oct. 26, 2006, Abstract, 1 page.
JP2007008974 A, Publication date: Jan. 18, 2007, Abstract, 1 page.
JP2007023263 A, Publication date: Feb. 1, 2007, Abstract, 1 page.
JP2007031491 A, Publication date: Feb. 8, 2007, Abstract, 1 page.
JP2007112882 A, Publication date: May 10, 2007, Abstract, 2 pages.
JP2007131692 A, Publication date: May 31, 2007, Abstract, 1 page.
JP2007169358 A, Publication date: Jul. 5, 2007, Abstract, 1 page.
JP2007177053 A, Publication date: Jul. 12, 2007, Abstract, 1 page.
JP2007186553 A, Publication date: Jul. 26, 2007, Abstract, 1 page.
JP2007186584 A, Publication date: Jul. 26, 2007, Abstract, 1 page.
JP2007224168 A, Publication date: Sep. 6, 2007, Abstract, 1 page.
JP2007238800 A, Publication date: Sep. 20, 2007, Abstract, 1 page.
JP 2007246716 A, Publication date: Sep. 27, 2007, Abstract, 2 pages.
International Searching Authority, Search Report, PCT/IB2012/050177, Date of mailing: May 4, 2012, 5 pages.
WO 2006/029677 A1, Publication date: Mar. 23, 2006, Abstract, 1 pages.
WO 2007/012660 A1, Publication date: Feb. 1, 2007, Abstract, 2 pages.
International Searching Authority, Written Opinion, PCT/IB2012/050177, Date of mailing: May 4, 2012, 6 pages.

* cited by examiner

THERMOPLASTIC COMPOSITIONS, METHOD OF MANUFACTURE, AND USES THEREOF

BACKGROUND

This disclosure relates to thermoplastic compositions, in particular laser-weldable thermoplastic compositions, methods of manufacture, and articles thereof.

Thermoplastic compositions are used in the manufacture of a wide variety of products, including laser-welded products. Near-infrared (NIR) laser-welding of two polymer articles by transmission welding requires one of the polymer articles to be at least partially transparent to laser light, and the other to absorb a significant amount of the laser light. An additional key requirement is that there is good physical contact between the parts during a welding process; a smooth surface is beneficial in this respect. The laser passes through the first laser transparent layer and is absorbed by the second polymer layer, generating heat in the exposed area. External pressure is applied to ensure uninterrupted contact and heat conduction between the parts resulting in the melting of both the absorbing and the transmitting polymers, thus generating a weld at the interface.

The level of NIR transmission in the upper part should allow sufficient laser density at the interface to facilitate effective welding. Otherwise, the joining of the two materials by laser transmission welding is either impossible or restricted to slow scan speeds, which is not very attractive as it lengthens the part assembly cycle time. Crystalline, or partially crystalline materials, such as PBT, are materials that can easily disperse the incoming radiation. Consequently, the extent of the laser energy at the joining interface is dramatically diminished and the adhesion between the two layers is reduced. Scattering effects are greatly enhanced when fillers such as glass fibers are present especially when the upper layer thickness is greater than 1 mm. Therefore, the laser-welding of crystalline material and particularly glass filled versions, is restricted if not impossible in a lot of cases.

SUMMARY

The above-described challenges in achieving high NIR transmission laser-weldable thermoplastics are overcome according to the several embodiments disclosed herein.

In one embodiment, a composition comprises a combination of:
(a) from more than 45 to less than 93 weight percent of a crystalline or semi-crystalline thermoplastic polyester component selected from poly(butylene terephthalate), poly(ethylene terephthalate), poly(butylene terephthalate) copolymers, poly(ethylene terephthalate) copolymers, and combinations thereof;
(b) from greater than 6 to less than 25 weight percent of an amorphous thermoplastic poly(ester) copolymer, poly(ester-carbonate), or combination thereof;
(c) from 1 to 30 weight percent of a filler; and
(d) optionally, from 0.01 to 5 weight percent of an antioxidant, mold release agent, colorant, stabilizer, or a combination thereof;
wherein an article having a 2 mm thickness and molded from the composition has
(i) a near infrared transmission at 960 nanometers of greater than 30 percent and
(ii) a Vicat softening temperature of at least 170° C.

In another embodiment, a composition comprises a combination of:
(a) from more than 45 to less than 86 weight percent of a crystalline or partially polyester component selected from crystalline poly(butylene terephthalate), poly(ethylene terephthalate), poly(butylene terephthalate) copolymers, poly(ethylene terephthalate) copolymers, and combinations thereof;
(b) from more than 9 to less than 25 weight percent of an amorphous poly(ester-carbonate);
(c) from 5 to 30 weight percent glass filler; and
(d) optionally from 0.01 to 5 weight percent of an antioxidant, mold release agent, colorant, stabilizer, or a combination thereof;
wherein an article having a 2 mm thickness and molded from the composition has
(i) a near infrared transmission at 960 nanometers of greater than 30 percent and
(ii) a Vicat softening temperature of at least 170° C.

In another embodiment, articles comprising the above compositions are disclosed herein.

A method of manufacture of an article comprising the above-described compositions comprises forming, extruding, casting, or molding a melt of the above compositions as disclosed herein.

A process for welding a first article comprising the above compositions to a second thermoplastic article is also disclosed, the first article being in physical contact with the second thermoplastic article, the process comprising applying laser radiation to the first article, wherein the radiation passes through the first article and the radiation is absorbed by the second article and sufficient heat is generated to weld the first article to the second article.

Further disclosed is a laser welded, molded article comprising:
an upper layer comprising a copolymer composition comprising the above-described compositions
a lower layer comprising a thermoplastic polymer; and
a laser welded bond between the upper layer and the lower layer.

The above described and other features and advantages will become more apparent by reference to the following figures and detailed description.

DETAILED DESCRIPTION

Surprisingly it was found that the combination of a crystalline or partially crystalline resin with a certain amorphous resin dramatically improved the transparency of the material to NIR laser light, thereby facilitating the laser welding of the compositions at faster weld speeds. The present inventive resin compositions for laser welding achieved high weld strength without significantly impairing the physical properties of the compositions, as compared to the pure crystalline or partially crystalline compositions. In particular, the disclosed compositions exhibited high NIR transparency and particularly good thermal properties, in particular a near infrared transmission at 960 nanometers of greater than 30 percent and a Vicat softening temperature of at least 170° C. Surprisingly, the molded parts additionally exhibited low surface roughness thereby allowing better contact between the surfaces to be joined.

Compounds are described herein using standard nomenclature. The singular forms "a," "an," and "the" include plural referents unless the context clearly dictates otherwise. All references are incorporated herein by reference. The term "combination thereof" means that one or more of the listed components is present, optionally together with one or more like components not listed. Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations. The endpoints of all ranges reciting the same characteristic or component are independently combinable and inclusive of the recited endpoint.

In an embodiment, a thermoplastic composition comprises a combination of: (a) from more than 45 to less than 93 weight percent of a crystalline or semi-crystalline thermoplastic polyester component selected from poly(butylene terephthalate), poly(ethylene terephthalate), poly(butylene terephthalate) copolymers, poly(ethylene terephthalate) copolymers, and combinations thereof; and (b) from greater than 6 to less than 25 weight percent (wt. %) of an amorphous thermoplastic poly(ester) copolymer, poly(ester-carbonate), or combination thereof. The compositions can further comprise from 1 to 30 wt. % of a filler; and/or from 0.01 to 5 wt. % of an antioxidant, mold release agent, colorant, stabilizer, or a combination thereof. In an especially advantageous feature, an article having a 2 mm thickness and molded from the composition has (i) a near infrared transmission at 960 nanometers of greater than 30 percent and (ii) a Vicat softening temperature of at least 170° C.

As set forth above, the thermoplastic compositions comprise from more than 45 to less than 93 wt. %, of a crystalline or semi-crystalline thermoplastic polyester component. The polyester component comprises poly(butylene terephthalate), poly(ethylene terephthalate), poly(butylene terephthalate) copolymers, poly(ethylene terephthalate) copolymers, and combinations thereof. As used herein a "crystalline" polymer contains only crystalline domains and a "semicrystalline" polymer comprises one or more crystalline domains and one or more amorphous domains.

The poly(butylene terephthalate), poly(ethylene terephthalate), poly(butylene terephthalate) copolymers, and poly(ethylene terephthalate) copolymers comprise repeating units of formula (1):

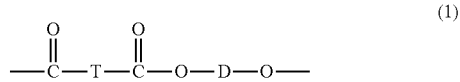

(1)

wherein T is a residue derived from a terephthalic acid or chemical equivalent thereof, and D is a residue derived from polymerization of an ethylene glycol, butylene diol, specifically 1,4-butane diol, or chemical equivalent thereof. Chemical equivalents of diacids include dialkyl esters, e.g., dimethyl esters, diaryl esters, anhydrides, salts, acid chlorides, acid bromides, and the like. Chemical equivalents of ethylene diol and butylene diol include esters, such as dialkylesters, diaryl esters, and the like.

In addition to units derived from a terephthalic acid or chemical equivalent thereof, and ethylene glycol or a butylene diol, specifically 1,4-butane diol, or chemical equivalent thereof, other T and/or D units can be present in the polyester, provided that the type or amount of such units do not significantly adversely affect the desired properties of the thermoplastic compositions.

Examples of aromatic dicarboxylic acids include 1,4-naphthalenedicarboxylic acid, 1,5-naphthalenedicarboxylic acid, 2,6-naphthalenedicarboxylic acid, and combinations comprising at least one of the foregoing dicarboxylic acids. Exemplary cycloaliphatic dicarboxylic acids include norbornene dicarboxylic acids, 1,4-cyclohexanedicarboxylic acids, and the like. In a specific embodiment, T is derived from a combination of terephthalic acid and isophthalic acid wherein the weight ratio of terephthalic acid to isophthalic acid is 99:1 to 10:90, specifically 55:1 to 50:50.

Examples of $C_{6-12}$ aromatic diols include, but are not limited to, resorcinol, hydroquinone, and pyrocatechol, as well as diols such as 1,5-naphthalene diol, 2,6-naphthalene diol, 1,4-naphthalene diol, 4,4'-dihydroxybiphenyl, bis(4-hydroxyphenyl)ether, bis(4-hydroxyphenyl)sulfone, and the like, and combinations comprising at least one of the foregoing aromatic diols.

Exemplary $C_{2-12}$ aliphatic diols include, but are not limited to, straight chain, branched, or cycloaliphatic alkane diols such as propylene glycol, i.e., 1,2- and 1,3-propylene glycol, 2,2-dimethyl-1,3-propane diol, 2-ethyl-2-methyl-1,3-propane diol, 1,4-but-2-ene diol, 1,3- and 1,5-pentane diol, dipropylene glycol, 2-methyl-1,5-pentane diol, 1,6-hexane diol, dimethanol decalin, dimethanol bicyclooctane, 1,4-cyclohexane dimethanol, including its cis- and trans-isomers, triethylene glycol, 1,10-decanediol; and combinations comprising at least of the foregoing diols.

The crystalline or semicrystalline polyesters can have an intrinsic viscosity, as determined in chloroform at 25° C., of 0.3 to 2 deciliters per gram, specifically 0.45 to 1.2 deciliters per gram. The polyesters can have a weight average molecular weight of 10,000 to 200,000 Daltons, specifically 20,000 to 100,000 Daltons as measured by gel permeation chromatography.

In addition to the crystalline or semicrystalline polyester component, the composition further comprises from greater than 6 to less than 25 wt. %, specifically from greater than 9 to less than 25 wt. %, of an amorphous thermoplastic poly(ester) copolymer, poly(ester-carbonate), or combination thereof.

The amorphous thermoplastic polyester copolymer is of formula (1), and has two or more different T groups and/or two or more different D groups Exemplary T and D groups can be derived from the above-described dicarboxylic acids and diols. In an embodiment, at least a portion of T is derived from cyclohexanedicarboxylic acid, terephthalic acid, isophthalic acid, a chemical equivalent of any of the foregoing, or a combination comprising at least one of the foregoing, and D is derived from 1,4-cyclohexanedimethanol, a $C_{2-4}$ diol, a chemical equivalent of the foregoing, or a combination comprising at least one of the foregoing. A specific amorphous (poly)ester copolymer includes copolyesters derived from a mixture of linear aliphatic diols, in particular ethylene glycol, butylene glycol, poly(ethylene glycol) or poly(butylene glycol), together with cycloaliphatic diols such as 1,4-hexane diol, dimethanol decalin, dimethanol bicyclooctane, 1,4-cyclohexane dimethanol and its cis- and trans-isomers, 1,10-decane diol, and the like. The ester units comprising the linear aliphatic or cycloaliphatic ester units can be present in the polymer chain as individual units, or as blocks of the same type of units. In an embodiment, polyesters of this type are poly(1,4-cyclohexanedimethylene terephthalate)-co-poly(ethylene terephthalate), known as PCTG when greater than 50 mol % of the ester groups are derived from 1,4-cyclohexanedimethylene terephthalate, or PETG when less than 50 mol % of the ester groups are derived from 1,4-cyclohexanedimethylene terephthalate. In another specific embodiment, the poly(1,4-cyclohexanedimethylene terephthalate)-co-poly(ethylene terephthalate) comprises up to 25 mole percent of a residue derived from a $C_{2-4}$ diol.

The amorphous poly(ester) copolymers can have an intrinsic viscosity, as determined in chloroform at 25° C., of 0.3 to 2 deciliters per gram, specifically 0.45 to 1.2 deciliters per gram. The polyesters can have a weight average molecular weight of 10,000 to 200,000 Daltons, specifically 20,000 to 100,000 Daltons as measured by gel permeation chromatography.

Poly(ester-carbonate) copolymers comprise units of formula (1) and recurring polycarbonate units of formula (2):

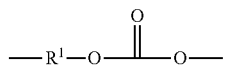
(2)

in which at least 60 percent of the total number of $R^1$ groups contain aromatic organic groups and the balance thereof are aliphatic, alicyclic, or aromatic groups. In an embodiment, each $R^1$ is a $C_{6-30}$ aromatic group, that is, contains at least one aromatic moiety. $R^1$ can be derived from a dihydroxy compound of the formula HO—$R^1$—OH, in particular a dihydroxy aromatic compound of formula (3):

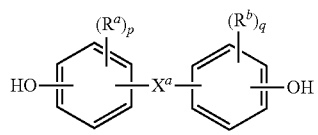
(3)

wherein $R^a$ and $R^b$ each represent a halogen or $C_{1-12}$ alkyl group and can be the same or different; and p and q are each independently integers of 0 to 4. Also in formula (6), $X^a$ represents a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic bridging group can be disposed such that the $C_6$ arylene groups connected thereto are each connected to a common alkylidene carbon or to different carbons of the $C_{1-18}$ organic bridging group. In one embodiment, p and q is each 1, and $R^a$ and $R^b$ are each a $C_{1-3}$ alkyl group, specifically methyl, disposed meta to the hydroxy group on each arylene group. In an embodiment, $X^a$ is a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Exemplary groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene.

Other useful aromatic dihydroxy compounds of the formula HO—$R^1$—OH include compounds of formula (4)

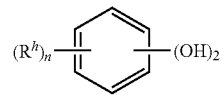
(4)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds of formulas (3) and (4) include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 4,4'-dihydroxybenzophenone, 3,3-bis(4-hydroxyphenyl)-2-butanone, bis(4-hydroxyphenyl) ether, bis(4-hydroxyphenyl)sulfide, bis(4-hydroxyphenyl) sulfoxide, bis(4-hydroxyphenyl)sulfone, 2,7-dihydroxypyrene, 6,6'-dihydroxy-3,3,3',3'-tetramethylspiro (bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

A specific amorphous poly(ester-carbonate) copolymers comprises ester units of formula (1) and carbonate units of formula (2) derived from bisphenol A. The relative ration of the ester:carbonate units can vary widely, e.g., from 99:1 to 1:99. Another specific poly(ester-carbonate) copolymer comprises, based on the total weight of the copolymer, 15 to 95 wt.

% of arylate ester units, and 5 to 85 wt. % of carbonate units. The arylate ester units are of formula (5):

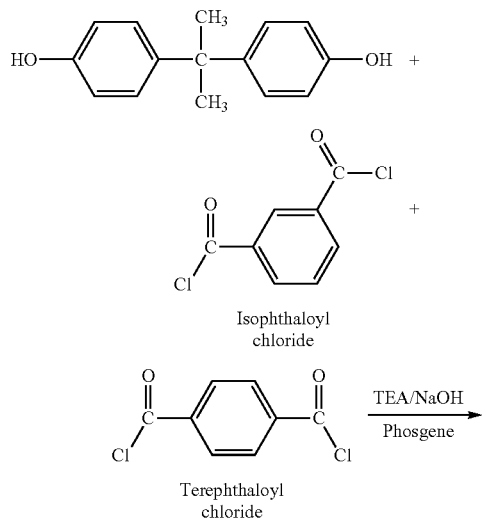

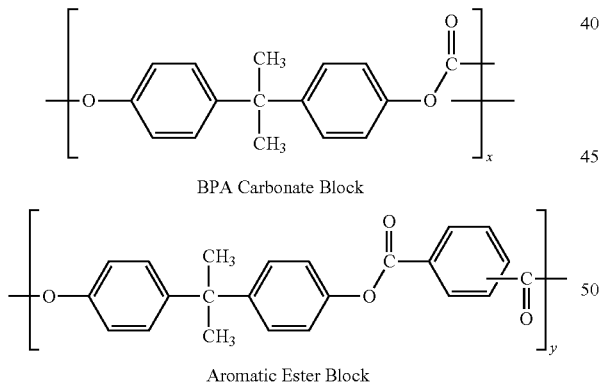

| Resin | Iso/Tere | Wt % Ester |
|-------|----------|------------|
| PPC   | 93/7     | 80         |
| PCE   | 50/50    | 60         |

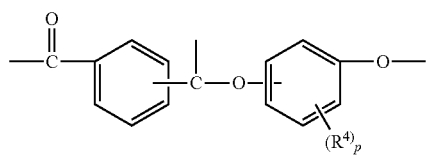

wherein each $R^4$ is independently a halogen or a $C_{1-4}$ alkyl, and p is 0 to 3. The arylate ester units can be derived from the reaction of a mixture of terephthalic acid and isophthalic acid or chemical equivalents thereof with compounds such as 5-methyl resorcinol, 5-ethyl resorcinol, 5-propyl resorcinol, 5-butyl resorcinol, 5-t-butyl resorcinol, 2,4,5-trifluoro resorcinol, 2,4,6-trifluoro resorcinol, 4,5,6-trifluoro resorcinol, 2,4,5-tribromo resorcinol, 2,4,6-tribromo resorcinol, 4,5,6-tribromo resorcinol, catechol, hydroquinone, 2-methyl hydroquinone, 2-ethyl hydroquinone, 2-propyl hydroquinone, 2-butyl hydroquinone, 2-t-butyl hydroquinone, 2,3,5-trimethyl hydroquinone, 2,3,5-tri-t-butyl hydroquinone, 2,3,5-trifluoro hydroquinone, 2,3,5-tribromo hydroquinone, or a combination comprising at least one of the foregoing compounds. The aromatic carbonate units in the poly(ester-carbonate) copolymers are of formula (4) as described above. Specifically, the carbonate units are derived from bisphenol A.

In a specific embodiment, the poly(ester-carbonate) copolymer is a poly(isophthalate-terephthalate-resorcinol ester)-co-(bisphenol A carbonate) polymer comprising repeating structures of formula (6):

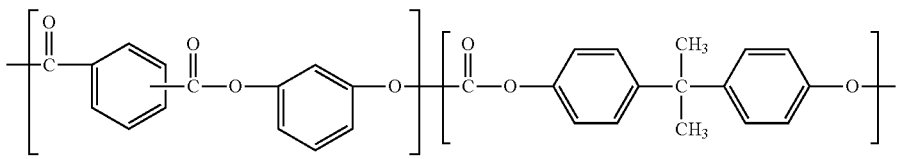

comprising, as stated above, 15 to 95 wt. % of arylate ester units, and 5 to 85 wt. % of carbonate units based on the total weight of copolymer (6).

The polyester-polycarbonate copolymer comprises terminal groups derived from the reaction with a chain stopper (also referred to as a capping agent), which limits molecular weight growth rate, and so controls molecular weight in the polycarbonate. The chain stoppers are monophenolic compounds of formula (7):

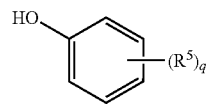

wherein each $R^5$ is independently halogen, $C_{1-22}$ alkyl, $C_{1-22}$ alkoxy, $C_{1-22}$ alkoxycarbonyl, $C_{6-10}$ aryl, $C_{6-10}$ aryloxy, $C_{6-10}$ aryloxycarbonyl, $C_{6-10}$ arylcarbonyl, $C_{7-22}$ alkylaryl, $C_{7-22}$ arylalkyl, $C_{6-30}$ 2-benzotriazole, or triazine, and q is 0 to 5. As used herein, $C_{6-16}$ benzotriazole includes unsubstituted and substituted benzotriazoles, wherein the benzotriazoles are substituted with up to three halogen, cyano, $C_{1-8}$ alkyl, $C_{1-8}$ alkoxy, $C_{6-10}$ aryl, or $C_{6-10}$ aryloxy groups. Exemplary monophenolic chain stoppers of formula (7) include phenol, p-cumyl-phenol, p-tertiary-butyl phenol, hydroxy diphenyl, monoethers of hydroquinones such as p-methoxyphenol, alkyl-substituted phenols including those with branched chain alkyl substituents having 8 to 9 carbon atoms, monophenolic UV absorber such as 4-substituted-2-hydroxybenzophenone, aryl salicylate, monoesters of diphenols such as resorcinol monobenzoate, 2-(2-hydroxyaryl)-benzotriazole, 2-(2-hydroxyaryl)-1,3,5-triazines, and the like. Specific monophenolic chain stoppers include phenol, p-cumylphenol, and resorcinol monobenzoate. The type and amount of chain stopper used in the manufacture of the poly (ester-carbonate) copolymers are selected to provide copolymers having an Mw of 1,500 to 100,000 Daltons, specifically 1,700 to 50,000 Daltons, and more specifically 2,000 to 40,000 Daltons. Molecular weight determinations are performed using gel permeation chromatography, using a crosslinked styrene-divinylbenzene column, and calibrated to bisphenol A polycarbonate references. Samples are prepared at a concentration of 1 milligram per milliliter, and are eluted at a flow rate of 1.0 milliliter per minute.

The thermoplastic compositions further comprise a filler in an amount from 1 to 30, specifically 5 to 30 wt. % of the total weight of the composition. Such fillers include fibrous reinforcing materials, for example, inorganic fibers (e.g., glass, asbestos, carbon, silica, alumina, silica-alumina, aluminum silicate, zirconia, potassium titanate, silicon carbide, or the like), inorganic whiskers (e.g., silicon carbide, alumina, boron nitride, or the like), organic fibers (e.g., aliphatic or aromatic polyamide, aromatic polyester, fluorine-containing resins, acrylic resin such as a polyacrylonitrile, rayon or the like), plate-like reinforcing materials (e.g., talc, mica, glass, graphite, and the like), particulate reinforcing materials (e.g., glass beads, glass powder, milled fiber (e.g., a milled glass fiber), or wollastonite, which can be in the form of a plate, column, or fiber. The average diameter of the fibrous reinforcing material can be, for example, 1 to 50 micrometers, specifically 3 to 30 μm micrometers, and the average length of the fibrous reinforcing material can be, for example, 100 micrometers to 3 mm, specifically 300 micrometers μm to 1 mm, and more specifically 500 micrometers to 1 mm. Moreover, the average particle size of the plate-like or particulate reinforcing material may be, for example, 0.1 to 100 μm and specifically 0.1 to 50 micrometers (e.g., 0.1 to 10 micrometers). These fillers or reinforcing materials may be used alone or in combination.

In a specific embodiment, the reinforcing filler is a glass or glassy filler, specifically a glass fiber, a glass flake, and a glass bead, talc, mica, wollastonite, or a potassium titanate fiber. In particular, the reinforcing filler is glass fibers, particularly, a chopped strand product. In an embodiment, no filler is present.

The thermoplastic composition can include various other additives ordinarily incorporated with compositions of this type, with the proviso that the additives are selected so as not to significantly adversely affect the desired properties of the composition. Combinations of additives can be used. Exemplary additives include an antioxidant, thermal stabilizer, light stabilizer, ultraviolet light absorbing additive, quencher, plasticizer, mold release agent, antistatic agent, flame retardant, anti-drip agent, radiation stabilizer, mold release agent, or a combination thereof. Each of the foregoing additives, when present, is used in amounts typical for thermoplastic blends, for example, 0.001 to 15 wt. % of the total weight of the blend, specifically 0.01 to 5 wt. % of the total weight of the blend, except for flame retardants, which are more typically used in amounts of 1 to 10 wt. %, based on the total weight of the composition, and fillers.

In one embodiment the composition comprises from 0.01 to 5 wt. % of a combination of an antioxidant, mold release agent, colorant, and/or stabilizer, based on the total weight of the composition.

Exemplary antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants can be used in amounts of 0.0001 to 1 wt. %, based on the total weight of the composition.

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers can be used in amounts of 0.0001 to 1 wt. %, based on the total weight of the composition.

Mold release agents include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate, the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; combinations of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials can be used in amounts of 0.001 to 1 wt. %, specifically 0.01 to 0.75 wt. %, and more specifically 0.1 to 0.5 wt. %, based on the total weight of the composition.

In a specific embodiment, a thermoplastic composition comprises a combination of:
(a) from more than 45 to less than 86 wt. % of a crystalline or partially polyester component selected from crystalline poly(butylene terephthalate), poly(ethylene terephthalate), poly(butylene terephthalate) copolymers, poly(ethylene terephthalate) copolymers, and combinations thereof;
(b) from more than 9 to less than 25 wt. % of an amorphous poly(ester-carbonate);
(c) from 5 to 30 wt. % glass filler; and
(d) optionally from 0.01 to 5 wt. % of an antioxidant, mold release agent, colorant, stabilizer, or a combination thereof;

wherein an article having a 2 mm thickness and molded from the composition has
  (i) a near infrared transmission at 960 nanometers of greater than 30 percent and
  (ii) a Vicat softening temperature of at least 170° C.

The thermoplastic composition can be manufactured by methods generally available in the art. For example, one method of manufacturing a thermoplastic composition comprises melt blending the components of the composition. More particularly, the powdered thermoplastic polymer components and other optional additives (including stabilizer packages, e.g., antioxidants, heat stabilizers, mold release agents, and the like) are first blended, in a HENSCHEL-Mixer® high speed mixer. Other low shear processes such as hand mixing can also accomplish this blending. The blend is then fed into the throat of an extruder via a hopper. Alternatively, one or more of the components can be incorporated into the composition by feeding directly into the extruder at the throat and/or downstream through a sidestuffer. Alternatively, any desired additives can also be compounded into a masterbatch, in particular the white pigment, and combined with the remaining polymeric components at any point in the process. The extruder is generally operated at a temperature higher than that necessary to cause the composition to flow. The extrudate is immediately quenched in a water batch and pelletized. Such pellets can be used for subsequent molding, shaping, or forming. In specific embodiments, a method of manufacturing a thermoplastic composition comprises melting any of the above-described compositions to form the laser-weldable composition.

Shaped, formed, or molded articles comprising the compositions are also provided. In one embodiment, an article is formed by extruding, casting, blow molding, or injection molding a melt of the thermoplastic composition. The article can be in the form of a film or sheet.

In an embodiment, the article is suitable for laser welding. A process for welding a first article comprising the above compositions to a second thermoplastic article comprises physically contacting at least a portion of a surface of the first article with at least a portion of a surface of the second thermoplastic article, applying laser radiation to the first article, wherein the radiation passes through the first article and the radiation is absorbed by the second article and sufficient heat is generated to weld the first article to the second article.

The second thermoplastic article can comprise a wide variety of thermoplastic polymer compositions that have been rendered laser absorbing by means known to those of skill in the art including the use of additives and/or colorants such as but not limited to carbon black. Exemplary polymer compositions can include but are not limited to, olefinic polymers, including polyethylene and its copolymers and terpolymers, polybutylene and its copolymers and terpolymers, polypropylene and its copolymers and terpolymers; alpha-olefin polymers, including linear or substantially linear interpolymers of ethylene and at least one alpha-olefin and atactic poly(alpha-olefins); rubbery block copolymers; polyamides; polyimides; polyesters such as poly(arylates), poly(ethylene terephthalate) and poly(butylene terephthalate); vinylic polymers such as polyvinyl chloride and polyvinyl esters such as polyvinyl acetate; acrylic homopolymers, copolymers and terpolymers; epoxies; polycarbonates, polyester-polycarbonates; polystyrene; poly(arylene ethers), including poly(phenylene ether); polyurethanes; phenoxy resins; polysulfones; polyethers; acetal resins; polyoxyethylenes; and combinations thereof. More particularly, the polymers are selected from the group consisting of polyethylene, ethylene copolymers, polypropylene, propylene copolymers, polyesters, polycarbonates, polyester-polycarbonates, polyamides, poly(arylene ether)s, and combinations thereof. In a specific embodiment, the second article comprises an olefinic polymer, polyamide, polyimide, polystyrene, polyarylene ether, polyurethane, phenoxy resin, polysulfone, polyether, acetal resin, polyester, vinylic polymer, acrylic, epoxy, polycarbonate, polyester-polycarbonate, styrene-acrylonitrile copolymers, or a combinations thereof. More specifically, the second article comprises a polycarbonate homopolymer or copolymer, polyester homopolymer or copolymer, e.g., a poly(carbonate-ester) and combinations thereof.

In one embodiment the second article comprises a glass-filled crystalline or semicrystalline composition that has been rendered laser absorbing. Compositions and methods for rendering such composition laser absorbing are known to those of skill in the art.

In another embodiment the second article comprises a glass-filled combination of a crystalline or semicrystalline composition and an amorphous thermoplastic poly(ester) copolymer, poly(ester-carbonate) or combination thereof that has been rendered laser absorbing. Compositions and methods for rendering such composition laser absorbing are known to those of skill in the art.

The thermoplastic composition of the second article can further comprise a near-infrared absorbing material (a material absorbing radiation wavelengths from 800 to 1400 nanometers) that is also not highly absorbing to visible light (radiation wavelengths from 350 nanometers to 800 nanometers). In particular the near-infrared absorbing material can be selected from organic dyes including polycyclic organic compounds such as perylenes, nanoscaled compounds metal complexes including metal oxides, mixed metal oxides, complex oxides, metal-sulphides, metal-borides, metal-phosphates, metal-carbonates, metal-sulphates, metal-nitrides, lanthanum hexaboride, cesium tungsten oxide, indium tin oxide, antimony tin oxide, indium zinc oxide, and combinations thereof. In one embodiment, the near-infrared material has an average particle size of 1 to 200 nanometers. Depending on the particular NIR absorbing material used, the NIR absorbing material can be present in the thermoplastic composition of the second article in an amount from 0.00001 to 5 wt. % of the composition. Suitable amounts provide effective NIR absorption, and are readily determined by one of ordinary skill in the art without undue experimentation. Lanthanum hexaboride and cesium tungsten oxide, for example, can be present in the composition in an amount from 0.00001 to 1 wt. %, still more specifically 0.00005 to 0.1 wt. %, and most specifically 0.0001 to 0.01 wt. %, based on total weight of the laser-weldable composition.

Also disclosed are laser-welded articles comprising the inventive thermoplastic compositions as described above in a first component, laser-welded to a second component comprising a second thermoplastic composition as described above.

The compositions and methods are further illustrated by the following Examples, which do not limit claims.

EXAMPLES

Materials

The materials shown in Table 1 were used in the Examples below.

TABLE 1

| COMPONENT | CHEMICAL DESCRIPTION | SOURCE |
|---|---|---|
| PBT 195 | Poly(1,4-butylene terephthalate), ($M_w$ = 66,000 g/mol, using polystyrene standards) | SABIC Innovative Plastics |

TABLE 1-continued

| COMPONENT | CHEMICAL DESCRIPTION | SOURCE |
|---|---|---|
| PBT-315 | Poly(1,4-butylene terephthalate), ($M_w$ = 115,000 g/mol, using polystyrene standards) | SABIC Innovative Plastics |
| PET | Poly(ethylene terephthalate) (IV > 0.55) | ACCORDIS |
| High IV PET | Poly(ethylene terephthalate) (IV > 0.75) | EASTMAN |
| PC 105 | Amorphous bisphenol A polycarbonate homopolymer ($M_w$ = 30,000 g/mol, using polystyrene standards) | LEXAN ®, SABIC Innovative Plastics |
| PC 125 | Amorphous bisphenol A polycarbonate homopolymer ($M_w$ = 23,000 g/mol, using polystyrene standards) | LEXAN ®, SABIC Innovative Plastics |
| 20:80 ITR-PC | Amorphous poly(20 wt % isophthalate-terephthalate-resorcinol ester)-co-(80 wt % bisphenol A carbonate) copolymer ($M_w$ = 60,000 g/mol, using polystyrene standards) | SABIC Innovative Plastics |
| 40:60 ITR-PC | Amorphous poly(40 mol % isophthalate-terephthalate-resorcinol ester)-co-(60 mol % bisphenol-A carbonate) copolymer ($M_w$ = 25,000 g/mol, PS standards) | SABIC Innovative Platics |
| 90:10 ITR-PC | Amorphous poly (90 wt. % isophthalate-terephthalate-resorcinol)-co-(10 wt. % bisphenol-A carbonate) copolymer ($M_w$ = 40,000 g/mol, using polystyrene standards) | SABIC Innovative Plastics |
| PPC-resin | Amorphous poly(ester-carbonate), bisphenol A based poly(phthalate-carbonate) containing 80% ester units ($M_w$ = 28,500 g/mol, using polystyrene standards) | SABIC Innovative Plastics |
| PCE-resin | Amorphous poly(ester-carbonate bisphenol A based poly(phthalate-carbonate) containing 60% ester units ($M_w$ = 28,000 g/mol, using polystyrene standards) | SABIC Innovative Plastics |
| PE (1d) | Poly(ethylene), low density | SABIC Innovative Plastics |
| Green 3 | MACROLEX ™ GREEN 5B | Lanxess |
| Red 135 | MACROLEX ™ RED EG | Lanxess |
| AO1076 | Octadecyl (3,5-di-tert-butyl-4-hydroxyphenyl)propionate | IRGANOX 1076, Ciba Specialty Chemicals |
| AO1010 | Pentaerythritol tetrakis(3,5-di-tert-butyl-4-hydroxyhydrocinnamate) | IRGANOX 1010, Ciba Specialty Chemicals |
| Glass fiber | $SiO_2$ - fibrous glass | Nippon Electric Glass |
| MZP | Monozinc phosphate-2-hydrate | Chemische Fabriek |
| ECN-EEA | Epoxy cresol novolac resin in ethylene-ethyl acrylate copolymer | Industrial Plastics Group |
| PETS | Pentaerythritol tetrastearate | Lonza, Inc. |
| Sodium acetate | Anhydrous sodium acetate | Quaron |

Techniques and Procedures

Sample Processing.

The samples containing PBT were prepared by melt extrusion on a Werner & Pfleiderer 25 mm twin screw extruder, using a nominal melt temperature of 250 to 275° C., 25 inches (635 mm) of mercury vacuum and 300 rpm. The extrudate was pelletized and dried at 110° C. for 3 hours.

The samples containing PET were prepared by melt extrusion on a Werner & Pfleiderer 25 mm twin screw extruder, using a nominal melt temperature of 270 to 290° C., 25 inches (635 mm) of mercury vacuum and 300 rpm. The PET samples were dried at 120° C. for 4 hours Test specimens were produced from the dried pellets and were injection molded at nominal temperatures of 250 to 290° C. for PBT based samples and 270 to 290° C. for PET samples.

Test Methods.

The laser-welded test pieces were sawn into strips having, e.g., a width of 15 mm or 20 mm, and the tensile strength of the weld was determined by clamping the test pieces and applying a force across the welded area at a rate of 5 mm/minute using a tensile tester (Lloyd draw bench: LR30K). The weld strength is calculated as the maximum load at break divided by the area of the weld, which is calculated as the width of the weld (laser beam width) times the length of the weld (15 mm or 20 mm for example)

Test Methods.

To laser weld two molded articles together, a first laser transparent, upper layer test piece (60 mm×60 mm×2 mm) molded from the specified compositions described in the tables & having a high gloss surface was overlapped on a laser absorbing, lower layer having a high gloss surface. For the 20% glass filled material the lower layer was Test Sample A while for the 30% glass filled materials this was Test Sample B. The overlapped area was then irradiated through the upper layer with a diode laser (960 nm) with a beam diameter of 2 mm. The maximum power output available was 120 W. The power and scanning speeds are shown in the tables.

Transmission. The near infrared (NIR) transmission data was measured on 2 mm thick molded parts and collected on a Perkin-Elmer Lambda 950 spectrophotometer at 960 nm Tensile Strength. The laser-welded test pieces were sawn into strips having, e.g., a width of 15 mm or 20 mm. The tensile strength of the weld was determined using a tensile tester (Lloyd draw bench: LR30K) by clamping the test pieces and applying a force across the welded area at a rate of 5 mm/minute. The weld strength was calculated as the maximum load at break divided by the width of the test piece.

Surface roughness. Surface roughness profiles were measured by a Veeco Dektak 6M using a 12.5 micrometer radius tip with 3 mg stylus load. The scan length was set to 1200 micrometers, the resolution to 0.267 micrometers per second. At least four measurements per sample were carried out. Results are reported as Ra, the average roughness, defined as the arithmetic average of the absolute values of the surface height deviations measured from the mean plane.

Izod and Vicat Softening Temperatures. Izod and Vicat Softening Temperatures were determined on molded samples in accordance with the methods shown in Table 2.

TABLE 2

| | Test Standard | Default Specimen Type | Units |
|---|---|---|---|
| ISO Izod at 23° C. | ISO 180 | Multi-purpose ISO 3167 Type A | $kJ/m^2$ |
| ISO Izod at −30° C. | ISO 180 | Multi-purpose ISO 3167 Type A | $kJ/m^2$ |
| ISO Vicat Softening Temperature | ISO 306 | Bar - 80 × 10 × 4 mm | ° C. |

Examples 1-4, Comparative Examples 1-6, and Test Sample A

Examples 1-4 and Comparative Examples 1-6 are based on PBT and contain 20% glass fiber as filler as shown in Table 3. The compositions were processed and tested as described above. Results are also shown in Table 3.

TABLE 3

| Component | C. Ex. 1 | C. Ex. 2 | C. Ex. 3 | C. Ex. 4 | C. Ex. 5 | C. Ex. 6 | Ex. 1 | Ex. 2 | Ex. 3 | Ex. 4 | Test sample A |
|---|---|---|---|---|---|---|---|---|---|---|---|
| PBT 195 | 29.4 | 29 | 20 | 29 | 25 | 43 | 30 | 35 | 42 | 45 | 36.5 |
| PBT 315 | 50.24 | 35.64 | 35.64 | 19.64 | 48.64 | 11.64 | 39.64 | 29.64 | 17.64 | 11.64 | 43.2 |
| PETS | 0.2 | 0.2 | 0.2 | 0.2 | 0.2 | 0.2 | 0.2 | 0.2 | 0.2 | 0.2 | 0.2 |
| AO1010 | 0.06 | 0.06 | 0.06 | 0.06 | 0.06 | 0.06 | 0.06 | 0.06 | 0.06 | 0.06 | |
| MZP | | 0.1 | 0.1 | 0.1 | 0.1 | 0.1 | 0.1 | 0.1 | 0.1 | 0.1 | |
| PC 125 | | 15 | 24 | 31 | | | | | | | |
| PPC-resin | | | | | 6 | 25 | 10 | 15 | 20 | 23 | |
| Carbon black | | | | | | | | | | | 0.3 |
| Glass fiber | 20 | 20 | 20 | 20 | 20 | 20 | 20 | 20 | 20 | 20 | |
| Sum | 100 | 100 | 100 | 100 | 100 | 100 | 100 | 100 | 100 | 100 | 100 |
| Properties | | | | | | | | | | | |
| Vicat (° C.) | 206 | 188 | 169 | 159 | 204 | 165 | 194 | 192 | 175 | 172 | |
| % Transmission (960 nm) | 21 | 28 | 32 | 37 | 24 | 82 | 32 | 49 | 69 | 72 | |

Discussion

The results in Table 3 show that the glass filled copolymer blend compositions containing from greater than 56 to less than 71 wt. % of a crystalline or semi-crystalline thermoplastic polyester and from greater than 9 to less than 25 wt. % of an amorphous thermoplastic copolymer exhibited surprisingly high transmission values in the near infrared region, in particular a transmission of at least 30% measured at 960 mm on 2 mm thick plaques. Even more unexpected was that these high transmission levels were achieved while retaining excellent thermal properties compared to compositions that did not have an amorphous copolymer in an amount from greater than 9 to less than 25 wt. %, namely a combination of a Vicat softening temperature of at least 170° C. and a transmission of at least 30% measured at 960 mm on 2 mm thick plaques.

The results are unexpected, because the use of blends containing an amorphous polymer in combination with a semi-crystalline thermoplastic resin would be expected to impair the thermal properties (Vicat) of such blends. Exs. 1-4 for instance, exhibited a Vicat softening temperature and % transmission that were each greater than 170° C. and 30%, respectively. In C. Exs. 1-6, on the other hand, one or both of a Vicat softening temperature and transmission are less than 170° and 30%. These results suggest that the use of the copolymer in the indicated amounts (as compared to using the copolymer outside the indicated ranges or use of a homopolymer) imparts unexpected properties.

Certain of the 20% glass filled PBT compositions were formed into upper layers and welded as described above. Results are also shown in Table 4.

TABLE 4

| | Power (W) [a] | Speed (mm/sec) | Max load/length (N/mm) |
|---|---|---|---|
| C.Ex. 1 | 110 | 20 | 77 |
| | 120 | 30 | 72 |
| | 120 | 40 | 53 |

TABLE 4-continued

| | Power (W) [a] | Speed (mm/sec) | Max load/length (N/mm) |
|---|---|---|---|
| C.Ex. 2 | 75 | 30 | 73 |
| | 85 | 40 | 70 |
| | 105 | 60 | 70 |
| C.Ex. 3 | 60 | 30 | 68 |
| | 70 | 40 | 69 |
| | 95 | 60 | 66 |
| Ex. 1 | 65 | 30 | 73 |
| | 75 | 40 | 73 |
| | 100 | 60 | 70 |
| Ex. 2 | 40 | 30 | 59 |
| | 45 | 40 | 58 |
| | 55 | 60 | 57 |

[a] Maximum power output was 120 W.

Discussion

The results in Table 4 show that the 20% glass filled copolymer blend compositions containing a crystalline or semi-crystalline thermoplastic polyester in combination with an amorphous thermoplastic copolymer in the indicated amounts (as represented by Exs. 1, and 2) exhibited surprisingly consistent weld strengths across a range of laser welding speeds and required lower laser power. Hence faster speeds and shorter part assembly cycle times are achievable, Examples 5-14, Comparative Examples 7-9, and Test Sample B Examples 5-14, Comparative Examples 7-9, and Test Sample B are based on PBT and contained 30% glass fiber as filler as shown in Table 5. The compositions were processed and tested as described above. Results are also shown in Table 5.

TABLE 5

| Component | C. Ex. 7 | C. Ex. 8 | C. Ex. 9 | Ex. 5 | Ex. 6 | Ex. 7 | Ex. 8 | Ex. 9 | Ex. 10 | Ex. 11 | Ex. 12 | Ex. 13 | Ex. 14 | Test sample B |
|---|---|---|---|---|---|---|---|---|---|---|---|---|---|---|
| PBT 195 | 33.2 | 16.1 | 16.1 | 24.1 | 26.2 | 37.9 | 40 | 26.2 | 33.56 | 26.2 | 37.9 | 26.2 | 33.56 | 55.23 |
| PBT 315 | 36.16 | 33.46 | 23.46 | 33.26 | 28.16 | 11.66 | 5.64 | 28.16 | 16 | 28.16 | 11.66 | 28.16 | 16 | 14.37 |
| AO1010 | 0.06 | 0.06 | 0.06 | 0.06 | 0.06 | 0.06 | 0.06 | 0.06 | 0.06 | 0.06 | 0.06 | 0.06 | 0.06 | |

TABLE 5-continued

| Component | C. Ex. 7 | C. Ex. 8 | C. Ex. 9 | Ex. 5 | Ex. 6 | Ex. 7 | Ex. 8 | Ex. 9 | Ex. 10 | Ex. 11 | Ex. 12 | Ex. 13 | Ex. 14 | Test sample B |
|---|---|---|---|---|---|---|---|---|---|---|---|---|---|---|
| Solvent Green 3 | 0.17 | 0.17 | 0.17 | 0.17 | 0.17 | 0.17 | 0.17 | 0.17 | 0.17 | 0.17 | 0.17 | 0.17 | 0.17 | |
| Solvent Red 135 | 0.13 | 0.13 | 0.13 | 0.13 | 0.13 | 0.13 | 0.13 | 0.13 | 0.13 | 0.13 | 0.13 | 0.13 | 0.13 | |
| Carbon black | | | | | | | | | | | | | | 0.3 |
| Paraffin | 0.1 | 0.13 | 0.13 | 0.1 | 0.1 | 0.1 | 0.1 | 0.1 | 0.1 | 0.1 | 0.1 | 0.1 | 0.1 | 0.1 |
| MZP | | 0.1 | 0.1 | 0.1 | 0.1 | 0.1 | 0.1 | 0.1 | 0.1 | 0.1 | 0.1 | 0.1 | 0.1 | |
| Glass | 30 | 30 | 30 | 30 | 30 | 30 | 30 | 30 | 30 | 30 | 30 | 30 | 30 | 30 |
| PPC | | | | 12 | 15 | 20 | 24 | | | | | | | |
| PCE | | | | | | | | 15 | 20 | | | | | |
| ITR 90/10 | | | | | | | | | | 15 | 20 | | | |
| ITR 20/80 | | | | | | | | | | | | 15 | | |
| ITR 40/60 | | | | | | | | | | | | | 20 | |
| PC 125 | | 20 | 30 | | | | | | | | | | | |
| Sum | 100 | 100 | 100 | 100 | 100 | 100 | 100 | 100 | 100 | 100 | 100 | 100 | 100 | 100 |
| Izod: 23° C. (kJ/m$^2$) | 56 | 51 | 51 | 59 | 59 | 49 | 45 | 54 | 47 | 56 | 50 | 54 | 44 | |
| Izod: −30° C. (kJ/m$^2$) | 55 | 54 | 57 | 54 | 59 | 55 | 53 | 54 | 54 | 55 | 51 | 48 | 52 | |
| Vicat (° C.) | 214 | 183 | 158 | 202 | 199 | 183 | 176 | 193 | 173 | 197 | 174 | 186 | 170 | |
| % Transmission (960 nm) | 20 | 27 | 41 | 40 | 51 | 64 | 75 | 47 | 62 | 37 | 56 | 40 | 54 | |

Certain of the 30% glass filled PBT compositions were formed into upper layers and welded as described above. Results are also shown in Table 6.

TABLE 6

| Property | C. Ex. 7 | Ex. 5 | Ex. 6 | Ex. 9 | Ex. 11 | Ex. 13 |
|---|---|---|---|---|---|---|
| % Transmission (960 nm) | 20 | 40 | 51 | 47 | 37 | 40 |
| Power (W)[a] | 120 | 50 | 35 | 35 | 55 | 45 |
| Speed (mm/sec) | 50 | 50 | 50 | 50 | 50 | 50 |
| Weld Strength (N/mm) | 28 | 53 | 51 | 55 | 57 | 58 |

[a]Maximum power output was 120 W.

Discussion

The results in Tables 5 and 6 show that 30% glass-filled copolymer blend compositions containing a crystalline or semi-crystalline thermoplastic polyester in combination with an amorphous thermoplastic copolymer in the indicated amounts from 45 to less than 59 wt. % of crystalline or semi-crystalline thermoplastic polyester and from greater than 11 to less than 25 wt. % of an amorphous thermoplastic copolymer also exhibited high transmission values in the near IR and excellent thermal properties as compared to compositions that did not have an amorphous copolymer in these amounts. The compositions had a Vicat softening temperature of at least 170° C. and a transmission of at least 30% measured at 960 mm on 2 mm thick parts.

The results are unexpected, because the use of blends containing an amorphous polymer in conjunction with a semi-crystalline thermoplastic resin would be expected to impair the thermal properties (Vicat) of such blends. The benefit of the compositions of the invention in a laser welding process is evidenced by the larger weld strength of the compositions of Ex. 5, Ex. 6, Ex. 9, Ex. 11, and Ex. 13, containing a crystalline or semi-crystalline thermoplastic polyester in combination with an amorphous thermoplastic copolymer within the bounds of the indicated amounts namely from 45 to less than 59 wt. % of crystalline or semi-crystalline thermoplastic polyester and from greater than 11 to less than 25 wt. % of an amorphous thermoplastic copolymer, compared to C.Ex. 7, having no amorphous poly(ester-carbonate).

The surface roughness of the glass-filled PBT compositions are shown in Table 7.

TABLE 7

| | C. Ex. 1 | Ex. 2 | C. Ex. 7 | Ex. 6 |
|---|---|---|---|---|
| Roughness (nm) | 400 | 139 | 990 | 189 |

Discussion

The results in Table 7 surprisingly show that the surface roughness of the glass-filled copolymer blend compositions based on PBT in combination with an amorphous thermoplastic copolymer as exemplified by Ex. 2 and Ex. 6 was also much lower than the glass-filled blends C.Ex. 1 and C.Ex. 7, which contain only a crystalline or semi-crystalline thermoplastic polyester.

Example 15 and Comparative Example 10

Example 17 and Comparative Example 12 are based on PET and contained 15% glass fiber as filler as shown in Table 7. The compositions were processed and tested as described above. Results are also shown in Table 8.

TABLE 8

| Item Description | Unit | C. Ex. 10 | Ex. 15 |
|---|---|---|---|
| PET | % | 83.14 | 73.14 |
| PPC-resin | % | | 10 |
| Solvent Red 135 | % | 0.17 | 0.17 |
| Solvent Green 3 | % | 0.13 | 0.13 |
| ECN-EEA | % | 0.45 | 0.45 |
| PETS | % | 0.2 | 0.2 |

TABLE 8-continued

| Item Description | | C. Ex. 10 | Ex. 15 |
|---|---|---|---|
| PE (ld) | % | 0.6 | 0.6 |
| Sodium Acetate | % | 0.25 | 0.25 |
| Antioxidant 1010 | % | 0.06 | 0.06 |
| Glass fiber | % | 15 | 15 |
| Sum | | 100 | 100 |
| | Mold Temp | | |
| % T at 960 nm | 60 degs | 30 | 51 |
| | 90 degs | 27 | 49 |
| Roughness (nm) | 60 degs | 1173 | 62 |
| | 90 degs | 321 | 262 |

Discussion

The results in Table 8 show that glass-filled copolymer blend compositions of PET containing an amorphous polyester-carbonate within the specified amounts also exhibited high transmission values in the near IR compared to a composition that did not have an amorphous copolymer in these amounts. The compositions had a transmission of at least 30% measured at 960 mm on 2 mm thick parts.

Surprisingly it was found that the surface roughness of the glass filled blends of PET thermoplastic resin based compositions, containing low wt. % of amorphous thermoplastic copolymer resin was much lower than glass filled blends of PET thermoplastic resin based compositions without the amorphous thermoplastic copolymer. In particular, Ex. 15 had a smoother surface compared to C.Ex. 12 across a wide range of molding temperatures. A smoother surface serves to decrease the interruptions in contact between the layers and benefits the joining process.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A composition comprising a combination of:
   (a) from more than 45 to less than 93 weight percent of a crystalline or semi-crystalline thermoplastic polyester component selected from poly(butylene terephthalate), poly(ethylene terephthalate), poly(butylene terephthalate) copolymers, poly(ethylene terephthalate) copolymers, and combinations thereof;
   (b) from greater than 9 to less than 25 weight percent of an amorphous poly(ester-carbonate);
   (c) from 5 to 30 weight percent of a glass fiber; and
   (d) optionally, from 0.01 to 5 wt. % of an antioxidant, mold release agent, colorant, stabilizer, or a combination thereof;
   wherein an article having a 2 mm thickness and molded from the composition has
   (i) a near infrared transmission at 960 nanometers of greater than 30 percent and
   (ii) a Vicat softening temperature of at least 170° C.,
   wherein an article having a 2 mm thickness and molded from the composition has a 10 percent improvement in percent transmission at 960 nanometers as compared to an article having a 2 mm thickness and molded from the same composition comprising (a) and not (b).

2. The composition of claim 1 wherein the crystalline or semi-crystalline thermoplastic is poly(butylene terephthalate).

3. The composition of claim 1 wherein the crystalline or semi-crystalline thermoplastic is poly(ethylene terephthalate).

4. The composition of claim 1 wherein the amorphous thermoplastic is a poly(ester-carbonate) comprising arylate ester units and carbonate units.

5. The composition of claim 4 wherein the ester units are present as arylate blocks comprising units derived from a 1,3-dihydroxybenzene and an aromatic dicarboxylic acid; and wherein the carbonate units are present as carbonate blocks alternating with the arylate blocks.

6. The composition of claim 5 wherein the arylate blocks comprise units derived from an unsubstituted resorcinol or a substituted resorcinol and an isophthalic acid, terephthalic acid or a combination thereof.

7. The composition of claim 5 wherein the carbonate blocks are bisphenol A carbonate blocks, unsubstituted resorcinol carbonate blocks, or a combination thereof.

8. The composition of claim 4 wherein the poly(ester-carbonate) comprises isophthalate-terephthalate-resorcinol arylate blocks and bisphenol A carbonate blocks.

9. The composition of claim 4 wherein the ester units are present as phthalate ester units derived from polymerization of a bisphenol and an aromatic dicarboxylic acid; and the carbonate units are derived from a bisphenol.

10. The composition of claim 9 wherein the bisphenol is bisphenol A and the aromatic dicarboxylic acid is a phthalic acid.

11. The composition of claim 10 wherein the aromatic dicarboxylic acid is selected from the group selected form isophthalic, terephthalic acid, and combinations thereof.

12. The composition of claim 1 wherein the glass fiber has an average diameter of 3 to 30 micrometers.

13. The composition of claim 1, further comprising from 0.01 to 5 weight percent of an antioxidant, mold release agent, colorant, stabilizer, or a combination thereof.

14. A method of manufacturing the composition of claim 1, comprising melt blending the components (a), (b), and optionally (c) and/or (d).

15. A molded article for laser welding comprising an extruded composition claim 1.

16. A process for welding a first article comprising the composition of claim 1 to a second thermoplastic article, at least a portion of a surface of the first article being in physical contact with at least a portion of a surface of the second thermoplastic article, the process comprising
   applying laser radiation to the first article, wherein the radiation passes through the first article and the radiation is absorbed by the second article and sufficient heat is generate to weld the first article to the second article.

17. The process of claim 16, wherein the second article comprises a thermoplastic comprising a material sufficient to absorb the radiation.

18. The process of claim 17, wherein the second article comprises a thermoplastic polymer is selected from polycarbonate, polyester, polycarbonate copolymers, polyester copolymers, and combinations thereof.

19. A laser welded, molded article comprising:
   an upper layer comprising a copolymer composition comprising:
   (a) from more than 45 to less than 93 weight percent of a crystalline or semi-crystalline thermoplastic polyester component selected from poly(butylene terephthalate), poly(ethylene terephthalate), poly(butylene terephthalate) copolymers poly(ethylene terephthalate) copolymers, and combinations thereof;

(b) from greater than 9 to less than 25 weight percent of an amorphous thermoplastic poly(ester-carbonate), wherein the ester units are present as arylate blocks comprising units derived from a 1,3-dihydroxybenzene and an aromatic dicarboxylic acid; and wherein the carbonate units are present as carbonate blocks alternating with the arylate blocks, (c) optionally, from 5 to 30 weight percent of a filler, and (d) optionally, from 0.01 to 5 weight percent of an antioxidant, mold release agent, colorant, stabilizer, or a combination thereof;

wherein a sample having a 2 mm thickness and molded from the copolymer composition has
   (i) a near infrared transmission at 960 nanometers of greater than 30 percent, and
   (ii) a Vicat softening temperature of at least 170° C.;

a lower layer comprising a thermoplastic polymer; and a laser welded bond between the upper layer and the lower layer;

wherein an article having a 2 mm thickness and molded from the composition has a 10 percent improvement in percent transmission at 960 nanometers as compared to an article having a 2 mm thickness and molded from the same composition comprising (a) and not (b).

20. A composition comprising a combination of:

(a) from more than 45 to less than 86 weight percent of a crystalline or partially polyester component selected from crystalline poly(butylene terephthalate), poly(ethylene terephthalate), poly(butylene terephthalate) copolymers, poly(ethylene terephthalate) copolymers, and combinations thereof;

(b) from more than 11 to less than 25 weight percent of an amorphous poly(ester-carbonate);

(c) from 15 to 30 weight percent glass filler; and (d) optionally from 0.01 to 5 weight percent of an antioxidant, mold release agent, colorant, stabilizer, or a combination thereof;

wherein an article having a 2 mm thickness and molded from the composition has
   (i) a near infrared transmission at 960 nanometers of greater than 30 percent and
   (ii) a Vicat softening temperature of at least 170° C.;

wherein an article having a 2 mm thickness and molded from the composition has a 10 percent improvement in percent transmission at 960 nanometers as compared to an article having a 2 mm thickness and molded from the same composition comprising (a) and not (b).

21. The composition of claim 20 wherein the amorphous poly(ester-carbonate) comprises phthalate ester units derived from polymerization of a bisphenol A and an aromatic dicarboxylic acid selected from the group selected form isophthalic, terephthalic acid, and combinations thereof; and wherein the carbonate units are derived from bisphenol A.

* * * * *